(12) United States Patent
Ams et al.

(10) Patent No.: US 9,127,773 B2
(45) Date of Patent: Sep. 8, 2015

(54) DEVICE FOR RADIALLY COMPRESSING AN ELASTIC LINE FOR A FLOWING MEDIUM

(75) Inventors: Felix Ams, Kaempfelbach (DE); Manuel Schuler, Neuenbuerg (DE); Manuel Boden, Oetisheim (DE)

(73) Assignee: Asco Numatics GmbH, Oelbronn-Duerr (DE)

( * ) Notice: Subject to any disclaimer, the term of this patent is extended or adjusted under 35 U.S.C. 154(b) by 570 days.

(21) Appl. No.: 13/532,141

(22) Filed: Jun. 25, 2012

(65) Prior Publication Data

US 2013/0009079 A1 Jan. 10, 2013

(30) Foreign Application Priority Data

Jul. 5, 2011 (EP) ..................................... 11005463

(51) Int. Cl.
*F16K 7/04* (2006.01)
*F16K 31/04* (2006.01)

(52) U.S. Cl.
CPC ............... *F16K 7/045* (2013.01); *F16K 31/046* (2013.01)

(58) Field of Classification Search
CPC .............................. F16K 7/045; F16K 31/046
USPC ............................................................. 251/7
See application file for complete search history.

(56) References Cited

U.S. PATENT DOCUMENTS

| 4,303,222 | A | * | 12/1981 | Campbell ......................... 251/7 |
| 4,436,277 | A | * | 3/1984 | Robak et al. ..................... 251/6 |
| 5,067,359 | A | * | 11/1991 | Flaig et al. ................. 251/129.11 |
| 5,078,362 | A | * | 1/1992 | Lawless et al. ................... 251/9 |
| 5,296,145 | A |  | 3/1994 | Allington et al. |
| 5,521,473 | A |  | 5/1996 | Mizuno et al. |
| 7,011,287 | B2 | * | 3/2006 | Elliott ............................... 251/7 |
| 7,104,275 | B2 | * | 9/2006 | Dille ................................. 251/7 |

FOREIGN PATENT DOCUMENTS

| CH | 701 531 | 1/2011 |
| EP | 0 623 673 | 11/1994 |
| EP | 1 308 657 | 5/2003 |
| EP | 1 664 600 | 6/2006 |
| GB | 2 274 326 | 7/1994 |
| JP | 4-136573 | 5/1992 |

OTHER PUBLICATIONS

"5-A H-Bridge for DC-Motor Applications", Jul. 31, 2007, XP55024243, http://www.infineon.com.
"L298—Dual Full-Bridge Driver" Jan. 31, 2000, http://www.st.com.
"Controlling DC Brush Motors With H-Bridge Driver ICS" Jan. 27, 2009, http://www.rohm.com.

* cited by examiner

*Primary Examiner* — Eric Keasel
(74) *Attorney, Agent, or Firm* — Michael J. Striker (57) ABSTRACT

A device for radially compressing an elastic line for a flowing medium at a line point includes an insertion channel (11) for insertion of a line section of the line. The insertion channel (11) includes a pressure element (12) displaceable transversely to the insertion channel (11), and a counterpart (13) located opposite the pressure element (12) on the insertion channel (11). Each of the pressure element (12) and counterpart (13) extends into the insertion channel (11). An actuator acts upon the pressure element (12) for the displacement thereof. The actuator preferably is an electric-motor drive unit (14) having an output shaft (15) and a translation module (16) for converting rotational motion of the output shaft (15) into linear motion of the pressure element (12).

20 Claims, 6 Drawing Sheets

DEVICE FOR RADIALLY COMPRESSING AN ELASTIC LINE FOR A FLOWING MEDIUM

CROSS REFERENCE TO RELATED APPLICATION

The invention described and claimed hereinbelow is also described in EP 11 005 463.2, filed Jul. 5, 2011. This European Patent Application, whose subject matter is incorporated here by reference, provides the basis for a claim of priority of invention under 35 U.S.C. 119 (a)-(d).

BACKGROUND OF THE INVENTION

The invention relates to a device for radially compressing an elastic line for a flowing medium at a line point, comprising an insertion channel for insertion of a line section of the line, comprising a pressure element, which is displaceable transversely to the insertion channel, and a counterpart located opposite the pressure element on the insertion channel, both of which extend into the insertion channel, and comprising an actuator, which acts upon the pressure element for the displacement thereof.

By way of such a device, the volume flow of a liquid or gaseous medium, which is also referred to as a fluid, is throttled to the point of complete interruption by compressing or pinching a line point of an elastic line, e.g. a tube. Fluids that are used are, for example, water, aqueous solutions in the medical and food industries, oils, air, neutral gasses.

A known device of this type for interrupting the passage of a volume flow of the flowing medium, which is also known as a tube pinching valve, interrupts the flow of the flowing medium by clamping an elastic tube. To this end, the actuator comprises an electromagnet, the solenoid armature of which is fixedly connected to the pressure element pressing radially on the tube, and a compression spring applying a load to the pressure element. In one embodiment of the tube pinching valve that is closed in a currentless manner, the compression spring presses the pressure element onto the tube point, thereby completely compressing the tube. When current is applied to the electromagnet, the spring force of the compression spring is equalized, the pressure element releases the tube and the original inner cross section of the elastic tube is restored.

SUMMARY OF THE INVENTION

The problem addressed by the invention is that of lowering the energy consumption of such a device and attaining greater compressive forces on the pressure element.

The device according to the invention has the advantage that, by designing the actuator as an electric-motor drive unit coupled to a translation module, markedly greater compressive forces for compressing the elastic line are attained as compared to an electromagnet. The greater compressive forces make it possible to reliably block lines having thicker walls or greater flow pressures. Simultaneously, the current consumption of the electric-motor drive unit is markedly less than is the case with an electromagnet, in particular when the drive unit advantageously comprises a reduction gear. In contrast to an electromagnet, the current consumption in the end positions of the pressure element can be reduced without changing the inner line cross section set by the pressure element at the line point. The design of the actuator according to the invention makes it possible to obtain greater travel by the pressure element without requiring additional energy, thereby allowing the use of lines having a large diameter.

All of the basic advantages of the device are retained, namely the prevention of turbulences or dead volumes when the volume flow is interrupted, permitting the medium to flow in both directions, a long service life of the line resulting from gentle and constant clamping pressure, the option to replace the line as a single part having contact with the medium and therefore prevent contamination when different fluids or gasses are used.

According to an advantageous embodiment of the invention, the translation module comprises an input element, which is fixedly connected to the output shaft, and an output element, which is fixedly connected to the pressure element and is preferably formed as one piece with the pressure element. The input element and the output element are coaxially disposed and each comprises one of two control contours, which glide on top of one another and rise in the axial direction. Advantageously, the rise of the control contours is selected such that the translation module is self-inhibiting. This has the advantage that, once a desired displacement travel of the pressure element and, therefore, a set flow cross section in the line, has been reached, the electric-motor drive unit can be switched in a currently manner without changing the position assumed by the pressure element. This results in considerable energy savings.

According to an advantageous embodiment of the invention, the input element and the output element are hollow-cylindrical, and the control contours are in the form of annular surfaces encircling the hollow cylinders. The hollow cylindrical input element is guided in the hollow cylindrical output element in a freely rotatable and axially displaceable manner. This structural configuration allows the translation module to have a particularly simple and low-cost design.

According to an advantageous embodiment of the invention, the insertion channel is contained in a base part carrying the drive unit and passes transversely through said base part, and the translation module is housed in the base part, wherein the pressure element connected to the output element of the translation module extends through a recess in the channel wall of the insertion channel, which crosses the insertion channel. These measures result in a space-saving, compact embodiment of the device.

According to an advantageous embodiment of the invention, a holder, which partially encloses the line section, is formed in the base part at both ends of the insertion channel for non-displaceably fixing the line section. Advantageously, the inner diameter of the holders is smaller than the diameter of the insertion channel, thereby allowing the elastic line section to be easily clamped in the holders.

According to an advantageous embodiment of the invention, the insertion channel and the two holders at the ends have an approximately C-shaped cross section and form an insertion opening for the line section, which is open on the sides.

According to an advantageous embodiment of the invention, the base part is subdivided into a channel body containing the insertion channel, and a flange body, which carries the drive unit and is equipped with a radially protruding mounting flange, said base part and flange body being fixedly interconnected. The translation module is housed in a cavity in the base part that is formed of a cavity section in the flange body and a cavity section in the base part. This separation of the base part markedly simplifies assembly of the device.

According to an advantageous embodiment of the invention, the output element of the translation module comprises a first axial stop and a second axial stop, which, together with a first counterstop formed on the base part and a second counterstop formed on the input element of the translation module, limit the displacement travel of the pressure element. Advantageously, the first axial stop is formed by a flange protruding radially from the output element, and the first counterstop is formed by an annular shoulder formed in the base part, preferably at the channel body of the base part, wherein the annular shoulder is preferably formed by designing the two cavity sections of the cavity housing the translation module with different cross sections, thereby producing a cavity step that forms the annular shoulder at the transition from the cavity section in the flange body having the larger cross section to the cavity section in the channel body having the smaller cross section. The second axial stop and the second counterstop are each formed by an axial web, which limits the control contours at the output element and the input element. In this manner, stops and counterstops can be produced in a favorable manner with respect to production engineering while achieving simple assembly.

According to an advantageous embodiment of the invention, the counterpart is removably inserted into a chute formed in the base part. The chute is disposed opposite the recess into which the pressure element extends, and crosses the insertion channel.

The counterpart can be operated manually and can be removed to permit the line section to be inserted into and removed from the insertion channel.

According to an advantageous embodiment of the invention, the pressure element is shaped as a blade having a rounded blade edge, and the counterpart comprises a finger-shaped, convex hump, which faces the blade edge and extends in the direction of the blade edge. The hump is disposed on an approximately cuboid carrier element, preferably being one piece therewith, and the carrier element is guided in the chute. Due to the rounded edges of the blade edge and the hump, the elastic line is pressed gently. Damage to the pinch point of the line is prevented, thereby contributing to a long service life of the line. Locking recesses formed on lateral surfaces of the carrier element facing away from each other result in advantageous, easily releasable locking of the counterpart in the chute.

According to an advantageous embodiment of the invention, the electric-motor drive unit comprises an electric motor, in the form of a direct-current motor, for example, which is disposed in an electric circuit that can be connected to supply voltage, and a gearbox in the form of a reduction gear, for example, comprising an output shaft. By designing the rotational speed ratio of the gearbox appropriately, the torque of the electric motor required to actuate the pressure element can be selected in such a way, e.g. greater or lesser, that energy savings are maximized.

According to an advantageous embodiment of the invention, a shunt for measuring current is disposed in the electric circuit of the electric motor. The measured quantity tapped at the shunt is fed to an electrical control unit, for example, such as control electronics, which control the electric motor. According to control signals applied to the control unit, the volume flow of the medium through the line point is clamped completely or is released to a greater or lesser extent. By way of the current measurement that is performed, various functions for saving energy can be implemented and controlled accordingly.

According to an advantageous embodiment of the invention, the control unit comprises a first control module, which adjusts the compressive force required on the pressure element depending on the measured quantity at the shunt. A second control module of the control unit detects, depending on the measured quantity, the end of the displacement travel of the pressure element and triggers a shut-off of the electric motor or a reduction of the current consumption thereof. A third control module of the control unit monitors the supply voltage and, if the voltage drops, triggers the displacement of the pressure element into an end position. For this purpose, a voltage divider for tapping the supply voltage and an energy storage mechanism are connected to the electric circuit, said energy storage mechanism supplying power to the electric motor for a short period of time if power failure occurs.

According to an advantageous embodiment of the invention, a bridge output stage is disposed in the electric circuit of the electric motor. The control unit comprises a fourth control module, which controls the bridge output stage, for reversing the rotational direction of the electric motor. By reversing the rotational direction of the electric drive unit, the input element of the translation module is rotated upward, and so the elasticity of the elastic line is sufficient to press the pressure element and the output element of the translation module upward and thereby restore the inner cross section of the line for the full volume flow. Additional return means for the pressure element are therefore omitted, which, in order to be overcome, would require that the electric-motor drive unit apply greater displacement forces to restore the line.

According to an advantageous embodiment of the invention, the control unit is a microprocessor in which the aforementioned control modules are integrated.

BRIEF DESCRIPTION OF THE DRAWINGS

The invention is explained below in greater detail with reference to an embodiment depicted in the drawings. They show.

DETAILED DESCRIPTION OF THE PREFERRED EMBODIMENTS

Figure 1:
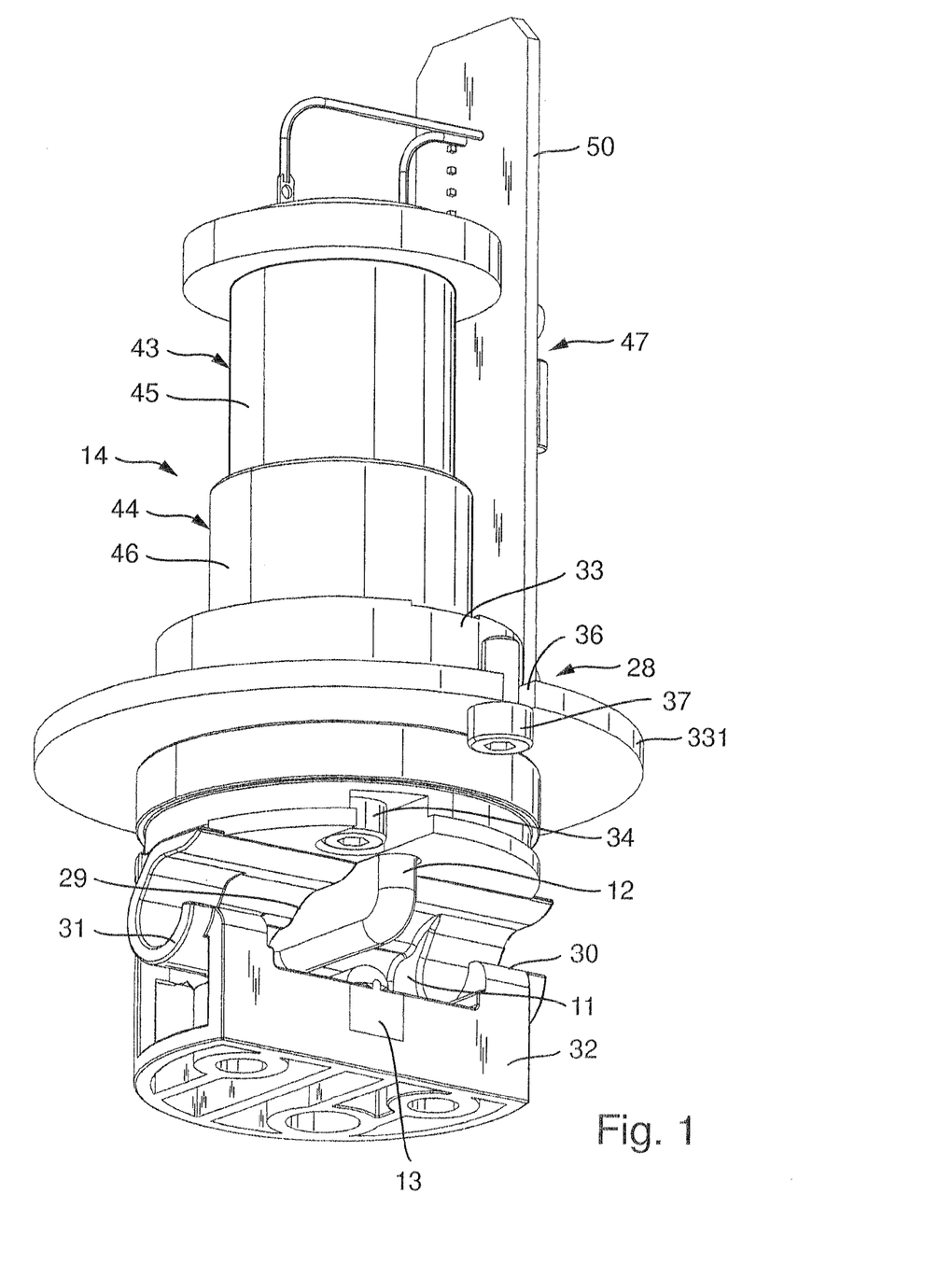
FIG. 1 a perspective view of a device for radially compressing an elastic line.
Figure 2:
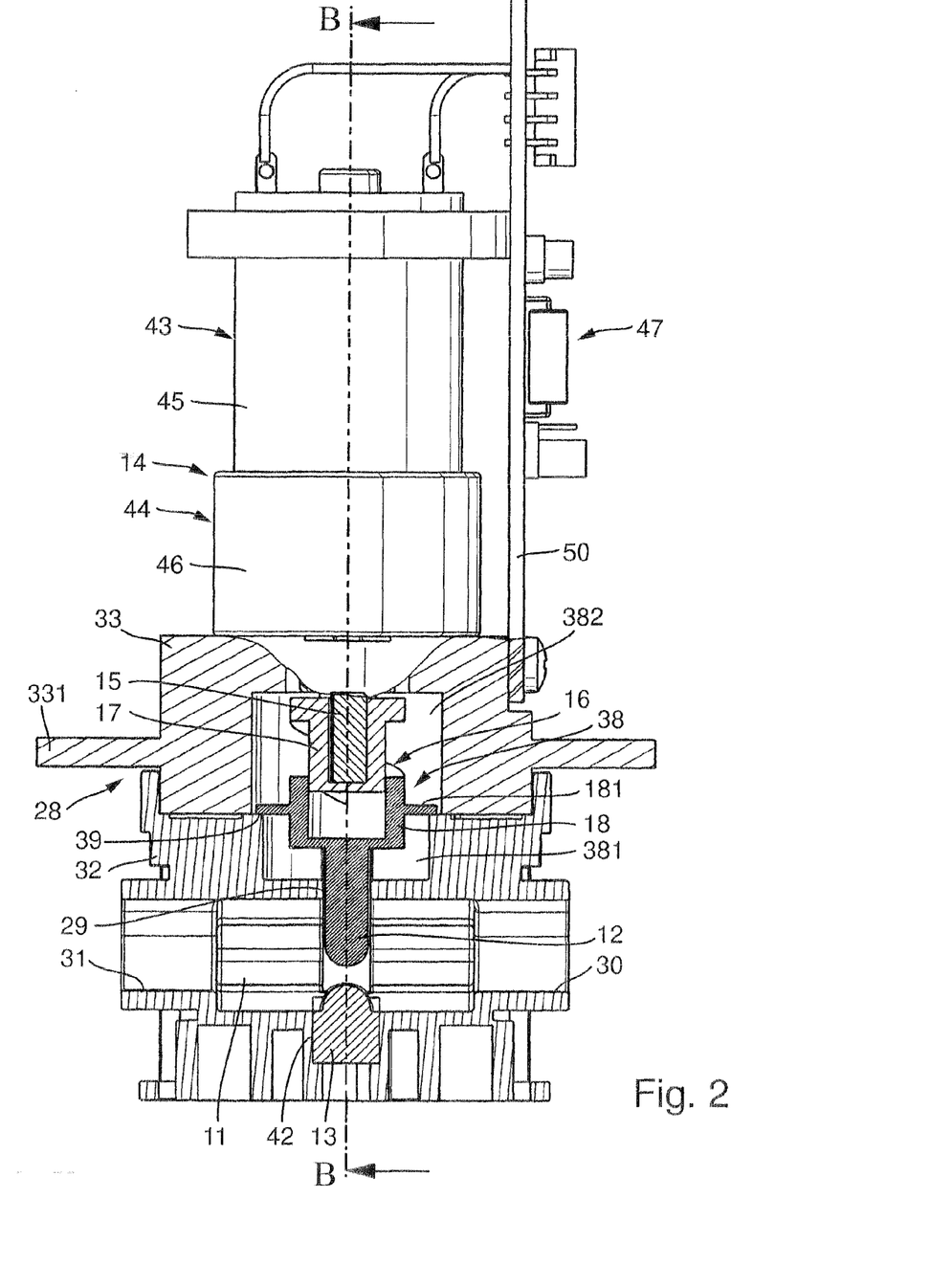
FIG. 2 a longitudinal view of the device in FIG. 1, along the line A-A in FIG. 3, FIG. 3 a sectional view along the line B-B in FIG. 2, FIG. 4 an enlarged perspective depiction of a translation module, which is connected to a pressure element, in the device according to FIGS. 1 to 3, FIG. 5 a perspective depiction of a counterpart in the device according to FIGS. 1 to 3, and FIG. 6 a wiring diagram of a control device of the device in FIGS. 1 to 3.
Figure 3:
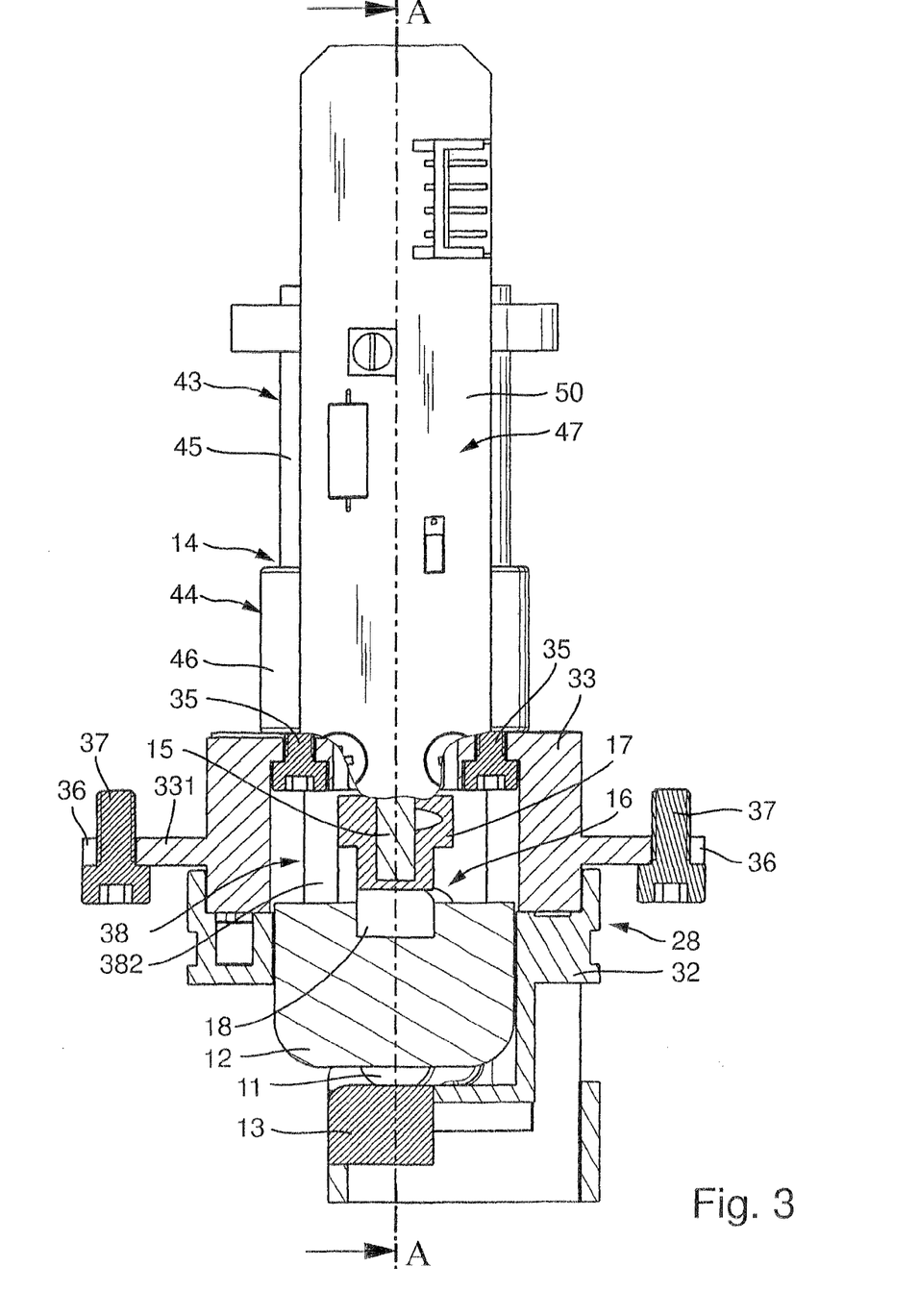

The device, which is shown in a perspective view in FIG. 1 and in two different views in FIGS. 2 and 3, for radially compressing an elastic line through which a liquid or gaseous medium can flow, e.g. a tube, at a defined line or tube point, which is referred to as a tube pinching valve, comprises an insertion channel 11 for insertion of a line section of the line, a pressure element 12, which is displaceable transversely to the insertion channel 11, a counterpart 13 located opposite the pressure element 12 on the insertion channel 11, and an actuator, which acts upon the pressure element 12 for the displacement thereof. The actuator comprises an electric-motor drive unit 14 having an output shaft 15 and a translation module 16, which converts rotational motion of the output shaft 15 into linear motion of the pressure element 12. The translation module 16 comprises an input element 17, which is fixedly connected to the output shaft 15, and an output element 18, which is fixedly connected to the pressure element. In the exemplary embodiment shown, the output element 18 and the pressure element 12 are formed as one piece. The input element 17 and the output element 18 are coaxially disposed and each comprise one of two control contours 19 and 20, respectively, which glide on top of one another and rise in the axial direction, wherein the rise of the control contours 19, 20 is selected such that the translation module 16 is self-inhibiting.

Figure 4:
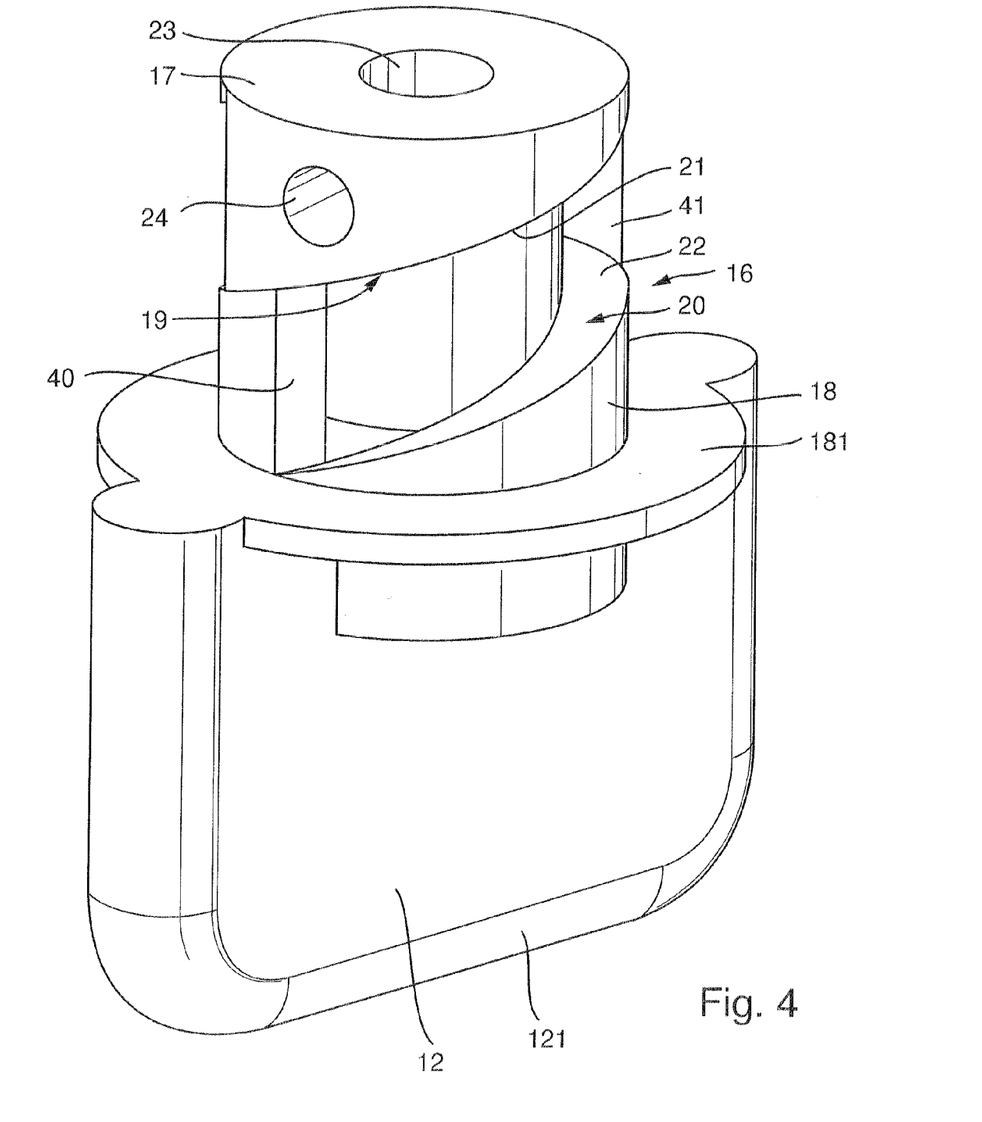

FIG. 4 shows a perspective, enlarged view of the translation module 16 comprising the pressure element 12. As shown there, the input element and output element 17, 18, respectively, have a hollow cylindrical design. The hollow cylindrical input element 17 is guided in the hollow cylindrical output element 18 in a freely rotatable and axially displaceable manner. The control contours 19, 20 are in the form of circumferential annular surfaces, annular surface 21 on the input element 17 and annular surface 22 on the output element 18. The input element 17 comprises a central axial bore 23 for sliding the input element 17 onto the output shaft 15, and a radial bore 24 having an inner thread to receive a screw, which is not shown, by way of which the input element 17 is fixedly clamped to the output shaft 15. The pressure element 12, which is integrally formed on the output element 18 as one piece, is shaped as a blade having a rounded blade edge 121. In addition, a radially protruding flange 181 is integrally formed on the output element 18, which forms a first axial stop for limiting the displacement travel of the pressure element 12.

Figure 5:
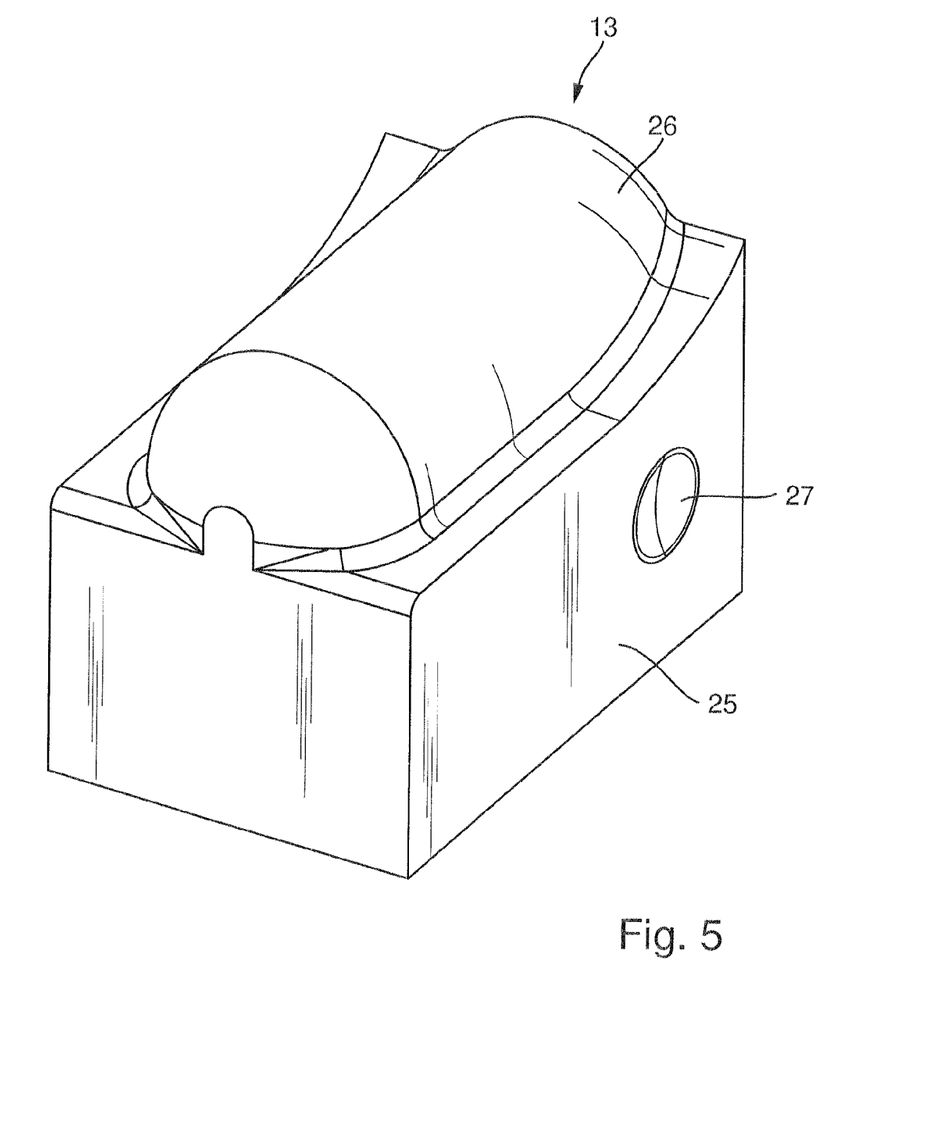

The counterpart 13, which is shown perspectively in an enlarged depiction in FIG. 5, comprises an approximately cuboid carrier element 25 having a finger-shaped, convex hump 26, which is integrally formed on the top side of the carrier element 25 as one piece therewith. On each of the longitudinal sides facing away from each other, the carrier element 25 is equipped with a locking recess 27 for locking. A handle for manually handling the counterpart 13 can also be integrally formed on the carrier element 25.

The insertion channel 11 is formed in the base part 28. The base part 28 carries the electric-motor drive unit 14 and houses the translation module 16, wherein the pressure element 12, which is connected to the output element 18 of the translation module 16 as one piece, extends through a recess 29 in the channel wall of the insertion channel 11, which crosses the insertion channel 11, and is displaceably guided therein. A holder 30 and 31 for fixing the line section, which partially encloses the inserted line section, is formed at the two ends of the insertion channel 11, wherein the inner diameter of the holders 30, 31 is smaller than the inner diameter of the insertion channel 11 in order to clamp the line section in the base part 28. The insertion channel 11 and holders 30, 31 have an approximately C-shaped cross section to form an insertion opening for the line section, said insertion opening extending transversely to the insertion channel 11.

In the exemplary embodiment, the base part 28 is subdivided into a channel body 32 containing the insertion channel 11 comprising holders 30, 31, and a flange body 33, which carries the electric-motor drive unit 14 and is equipped with a radially protruding mounting flange 331. The channel body 32 and the flange body 33 are fixedly interconnected using screws 34 (FIG. 1). The flange body 33 is attached to the electric-motor drive unit 14 using screws 35 (FIG. 3). The mounting flange 331 comprises two recesses 36 at the edge for the insertion of fastening screws 37 (FIG. 3).

The translation module 16 is disposed in a cavity 38 formed in the interior of the base part 28, which comprises two cavity sections 381 and 382, of which the cavity section 381 is formed in the channel body 32, and the cavity section 382 is formed in the flange body 33. The cross section of the cavity section 381 is smaller than the cross section of the cavity section 382, and so a cavity step having an annular shoulder 39 forms at the transition of the two cavity sections 381, 382, which forms a first counterstop to the first axial stop formed by the flange 181 at the output element 18 of the translation module 16. The first axial stop and the first counterstop limit the displacement travel of the pressure element 12 toward the counterpart 13. A second axial stop at the output element 18 of the translation module 16 limits, by way of a second counterstop at the input element 17 of the translation module 16, the upward displacement travel of the pressure element 12, that is, away from the counterpart 13. The second axial stop is formed by an axial web 40 at the output element 18, which limits the control contour 20, that is, the annular surface 22, and the second counterstop is formed by an axial web 41 that limits the control contour 19, that is, the annular surface 21, at the input element 17 (FIG. 4).

To receive the counterpart 13, a chute 42, which crosses the insertion channel 11, is formed in the base part 28, more precisely, in the channel body 32, opposite the recess 29 for the pressure element 12 at the insertion channel 11 (FIG. 3). The dimensions of the chute 42 and the carrier element 25 of the counterpart 13 are matched to each other such that the counterpart 13 can be inserted into the chute 42 in a form-fit manner, wherein the finger-shaped hump 26 formed on the top side of the carrier element 25 extends along the rounded blade edge 121 of the pressure element 12 and protrudes into the insertion channel 11. The counterpart 13 is locked in to the insertion position thereof in the chute 42 by way of the locking recess 27 in the carrier element 25 (FIG. 5). By way of a handle, which is formed on the carrier element 25 and is not shown here, the counterpart 13 in FIG. 3 can be manually removed from the chute 42 to the left to permit easy removal or replacement, as needed, of a line section located in the insertion channel 11.

The described device for clamping the elastic line comprises the electric-motor drive unit 14, an electric motor 43, which can be connected to a supply voltage, e.g. a direct-current motor that can be connected to a 12 V or 24 V DC voltage, and a gearbox 33 comprising the output shaft 15, e.g. a reduction gear, of which only the motor housing 45 and the gearbox housing 46 are shown in FIGS. 1 to 3. The connection for the supply voltage takes place by way of a control device 47, which has connection terminals 48 (+) and 49 (−) for this purpose. The control device 47 is disposed on a mounting plate 50, which is mounted on the base part 28, more precisely on the flange body 28, which extends along the electric-motor drive unit 14 and is supported against the motor housing 45.

Figure 6:
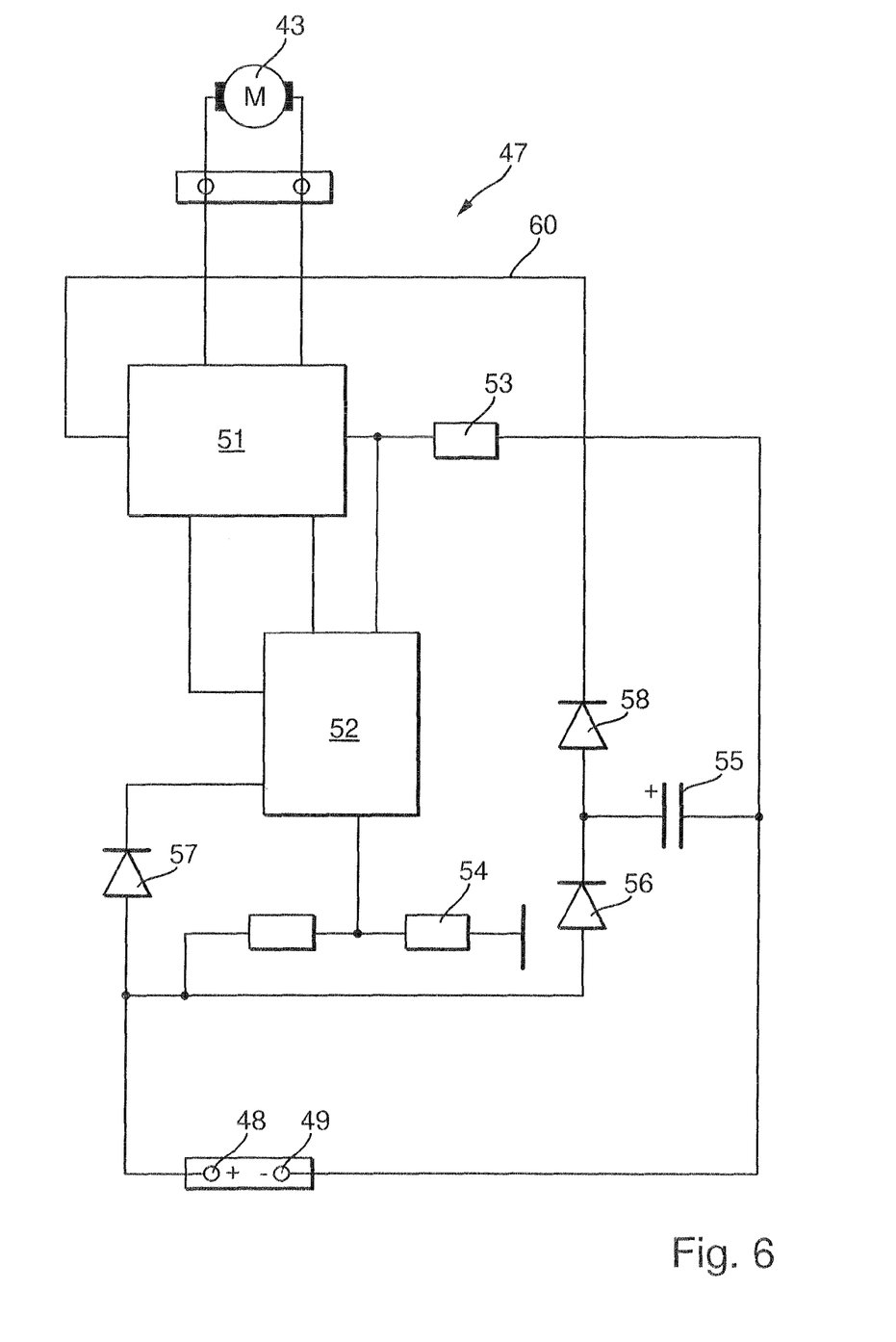

The control device 47, the wiring diagram of which is shown in FIG. 6, has an electric circuit 60 connected to the connection terminals 48, 49, to which the electric motor 43 is connected by way of a bridge output stage 51, and a control unit 52, e.g. control electronics, for controlling the electric motor 43 in inverse directions of rotation. Furthermore, a shunt 53 for measuring current is disposed in the electric circuit 60, the measured quantity of which is fed to the control unit 52. A voltage divider 54 for tapping the supply voltage is connected to the electric circuit 60, wherein the voltage tap of the voltage divider 54 is fed to the control unit 52. An energy storage mechanism 55 is directly connected to the negative connection terminal 49 and, via a polarity reversal protection diode 56, to the positive connection terminal 48, to which the voltage divider 54 is also connected. The control unit 52 is connected to the positive connection terminal 48 by way of a further polarity reversal connection diode 57, and is connected to the bridge output stage by way of control lines. A decoupling diode 58 is also disposed in the electric circuit branch between the bridge circuit 51 and the connection point of the energy storage mechanism 55 and the polarity reversal protection diode 56.

The control unit 52 comprises a plurality of control modules, which are combined in a microprocessor. The compressive force of the pressure element 12 is adjusted by way of a first control module depending on the measured quantity delivered by the shunt 53. A second control module detects, depending on the measured quantity of the shunt 53, the end of the displacement travel of the pressure element 12 and triggers a shut-off of the electric motor 43 or a reduction of the current consumption thereof. A third control module triggers a displacement of the pressure element 12 into a specified displacement end position depending on the voltage supplied by the voltage divider tap of the control unit 52 if the supply voltage drops. The energy storage mechanism 55, which can be in the form of a capacitor or a rechargeable battery, and which is connected to the electric circuit 60 of the electric motor 43, supplies power to the electric motor 43 for a short period of time if the supply voltage fails, thereby enabling said electric motor to be displaced to the end position thereof. Finally, a fourth module controls the bridge end circuit 51 in order to reverse the rotational direction of the electric motor 43.

It will be understood that each of the elements described above, or two or more together, may also find a useful application in other types of constructions differing from the types described above.

While the invention has been illustrated and described as embodied in a device for radially compressing an elastic line for a flowing medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for radially compressing an elastic line for a flowing medium at a line point, comprising:
   an insertion channel (11) for insertion of a line section of the line,
   a pressure element (12) displaceable transversely to the insertion channel (11), and
   a counterpart (13) located opposite the pressure element (12) on the insertion channel (11),
   wherein each of said pressure element (12) and said counterpart (13) extends into the insertion channel (11),
   said device further comprising an actuator adapted to act upon the pressure element (12) for the displacement thereof,
   wherein the actuator comprises an electric-motor drive unit (14) having an output shaft (15) and a translation module (16) for converting rotational motion of the output shaft (15) into linear motion of the pressure element (12),
   wherein the translation module (16) comprises an input element (17) which is fixedly connected to the output shaft (15), and an output element (18), which is fixedly connected to the pressure element (12),
   wherein the input element and the output element (17, 18) are coaxially disposed and each comprise one of two control contours (19, 20), which glide on top of one another and rise in the axial direction,
   wherein the rise of the control contours (19, 20) is selected such that the translation module (16) is self-inhibiting,
   wherein the insertion channel (11) is contained in a base part (28), said base part carrying the electric-motor drive unit (14), wherein the insertion channel passes transversely through said base part,
   wherein the translation module (16) is housed in the base part (28), and wherein the pressure element (12) connected to the translation module (16) extends through a recess (29) in the channel wall of the insertion channel (11), which crosses the insertion channel (11), and
   wherein the counterpart (13) is removably inserted in a chute (42) crossing the insertion channel (11) and is formed in the base part (28) opposite the recess (29).

2. The device according to claim 1, wherein the input element and the output element (17, 18) have a hollow cylindrical design, and the hollow cylindrical input element (17) is guided in the hollow cylindrical output element (18), and wherein the control contours (19, 20) are in the form of circumferential annular surfaces (21, 22).

3. The device according to claim 1, further comprising a holder (30, 31) formed in the base part (28) at both ends of the insertion channel (11) for non-displaceably fixing the line section, wherein said holder (30, 31) partially encloses an inserted line section.

4. The device according to claim 3, wherein the insertion channel (11) and holders (30, 31) have an approximately C-shaped cross section to form an insertion opening for the line section.

5. The device according to claim 1, wherein the output element (18) of the translation module (16) comprises a first axial stop and a second axial stop, which, together with a first counterstop formed on a base part (28) containing said insertion channel, and a second counterstop formed on the input element (17) of the translation module (16), limit the displacement travel of the pressure element (12).

6. The device according to claim 5, wherein the first axial stop is formed by a flange protruding radially at the output element (18), and the first counterstop is formed by an annular shoulder (39) formed in the base part (28).

7. The device according to claim 5, wherein the second axial stop and the second counterstop are each formed by an axial web (41, 40) limiting the control contours (19, 20) on the input element and the output element (17, 18).

8. The device according to claim 1, wherein the pressure element (12) is shaped as a blade having a rounded blade edge (121), and the counterpart (13) comprises a convex hump (26), which faces the blade edge (121) and extends in the direction of the blade edge (121).

9. The device according to claim 8, wherein the hump (26) is disposed on the surface of a cuboid carrier element (25), and is formed as one piece therewith, and wherein the carrier element (25) is guided in a chute (42) crossing the insertion channel.

10. The device according to claim 1, wherein the base part (28) is subdivided into a channel body (32) containing the insertion channel (11), and a flange body (33) that carries the drive unit (14) and is equipped with a radially protruding mounting flange (331), said base part and flange body being fixedly interconnected.

11. The device according to claim 10, wherein the translation module (16) is disposed in a cavity (38) formed in the base part (28), which comprises a cavity section (381) formed in the channel body (32) and a cavity section (382) formed in the flange body (33).

12. The device according to claim 11, wherein the cavity section (382) in the flange body (33) has a larger cross section than the cavity section (381) in the channel body (32), and the annular shoulder (39) in the base part (28), which forms the first counterstop, is formed by a cavity step forming at the transition from the cavity section (382) having the larger cross section to the cavity section (381) having the smaller cross section.

13. The device according to claim 1, wherein the electric-motor drive unit (14) comprises an electric motor (43) disposed in an electric circuit (60) that is connected to supply voltage, and wherein a gearbox (44) in the form of a reduction gear comprises the output shaft (15).

14. The device according to claim 13, wherein a shunt (53) for measuring current is disposed in the electric circuit (60) of the electric motor (43), and a measured quantity tapped at the shunt (53) is fed to a control unit (52) that controls the electric motor (43).

15. The device according to claim 14, wherein the control unit (52) comprises a first control module that adjusts the compressive force of the pressure element (12) depending on the measured quantity.

16. The device according to claim 15, wherein the control unit (52) is in the form of a microprocessor that comprises the control modules.

17. The device according to claim 14, wherein the control unit (52) comprises a second control module, which, depending on the measured quantity, detects the end of a displacement travel of the pressure element (12) and triggers a shut-off of the electric motor (53) or a reduction in the current consumption thereof.

18. The device according to claim 14, wherein a voltage divider (54) for tapping the supply voltage is connected to the electric circuit (60) of the electric motor (53), and the control unit (52) comprises a third control module, to which the voltage tapped at the voltage divider (54) is fed and, depending on a voltage drop of the tapped voltage, triggers displacement of the pressure element (12) into an end position.

19. The device according to claim 18, wherein an energy storage mechanism (55) is connected to the electric circuit (60) of the electric motor (43), which supplies power to the electric motor (43) temporarily if the supply voltage fails.

20. The device according to claim 14, wherein a bridge output stage (51) is disposed in the electric circuit (60) of the electric motor (43), and the control unit (52) comprises a fourth module, which controls the bridge output stage (51), for reversing the rotational direction of the electric motor (43).

* * * * *